(12) United States Patent
Noble, Jr.

(10) Patent No.: US 9,736,307 B1
(45) Date of Patent: *Aug. 15, 2017

(54) TELEPHONE CALL PROCESSING MODIFICATIONS RELATED TO CALL ACCEPTANCE FOR AN INCOMING CALL RECEIVED AT A CONTACT CENTER

(71) Applicant: Noble Systems Corporation, Atlanta, GA (US)

(72) Inventor: James K. Noble, Jr., Marietta, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/259,562

(22) Filed: Sep. 8, 2016

Related U.S. Application Data

(63) Continuation of application No. 14/959,544, filed on Dec. 4, 2015, now Pat. No. 9,560,210.

(51) Int. Cl.
*H04M 15/00* (2006.01)
*H04M 3/00* (2006.01)
*H04M 3/523* (2006.01)
*H04M 3/51* (2006.01)
*H04M 3/02* (2006.01)
*H04L 29/06* (2006.01)

(52) U.S. Cl.
CPC ............ *H04M 3/523* (2013.01); *H04M 3/02* (2013.01); *H04M 3/5141* (2013.01); *H04L 65/1006* (2013.01); *H04M 2207/08* (2013.01)

(58) Field of Classification Search
None
See application file for complete search history.

(56) References Cited

U.S. PATENT DOCUMENTS

| 5,247,569 | A | 9/1993 | Cave |
| 5,710,807 | A | 1/1998 | Smith |
| 5,956,393 | A | 9/1999 | Tessler et al. |
| 5,960,070 | A | 9/1999 | O'Donovan |
| 6,252,954 | B1 | 6/2001 | Malik |
| 6,295,354 | B1 | 9/2001 | Dezonno |

(Continued)

OTHER PUBLICATIONS

Cisco, Troubleshooting No Ringback Tone on ISDN-VoIP (H.323) Calls, CISCO, Nov. 27, 2005, 9 pages.

(Continued)

*Primary Examiner* — Quoc D Tran

(57) ABSTRACT

Modifications to the call acceptance process in a call handler allows determination of how to process a call before the call is answered. In one embodiment a call handler receives an incoming call notification message that include call related information, such as the calling and called telephone numbers. A call acceptance timer is started after the incoming call notification message is received. Prior to accepting the call, the call handler uses the call related information to ascertain an appropriate queue and an available agent in that queue. If an appropriate agent is available, the timer is stopped, the call is accepted, and the call is routed to the appropriate agent. If an agent is not available, then upon expiry of the timer, the call is accepted and an announcement may be played to the calling party, while awaiting for an agent to become available.

20 Claims, 9 Drawing Sheets

(56) References Cited

U.S. PATENT DOCUMENTS

| | | | |
|---|---|---|---|
| 6,496,580 B1 | 12/2002 | Chack | |
| 6,639,982 B1 | 10/2003 | Stuart et al. | |
| 6,721,284 B1 | 4/2004 | Mottishaw | |
| 7,593,874 B1 | 9/2009 | Yoshizawa | |
| 9,560,210 B1 * | 1/2017 | Noble, Jr. ............. | H04M 15/60 |

OTHER PUBLICATIONS

Internet Engineering Task Force, Draft SIP-ISUP Mapping, Aug. 2001, Internet Engineering Task Force, 49 pages.
ISDN PRI User-Network Interface Specification, Nortel, NIS-A211-1, Aug. 1998, 545 pages.
QWEST Communications International Inc. Technical Document, PRI ISDN Service, QWEST Communcations, Dec. 2001, 37 pages.
RFC-3261, SIP: Session Initition Protocol, The Internet Society, 2002 (269 pages).
RFC 3262—Realiabililty of Provisional Responses in the Session Initiation Protocol (SIP), The Internet Society, 2002, 14 pages.
Technical Reference 41459, ATT ISDN PRI Specification, ATT, 1999, 452 pages.
ACD—Inbound Contact Management, Advertising Slick, 1 page, 2010, Noble Systems, Atlanta GA.
Brochure describing "RightConnect", Noble Systems, Atlanta, GA, circa 1998, 1 page.

* cited by examiner

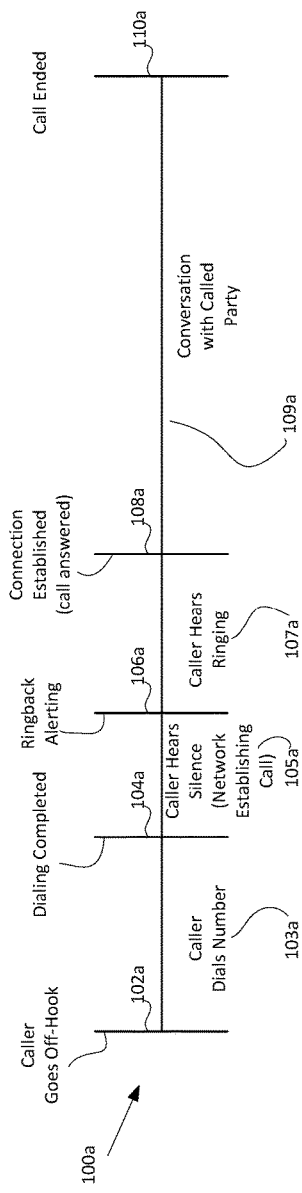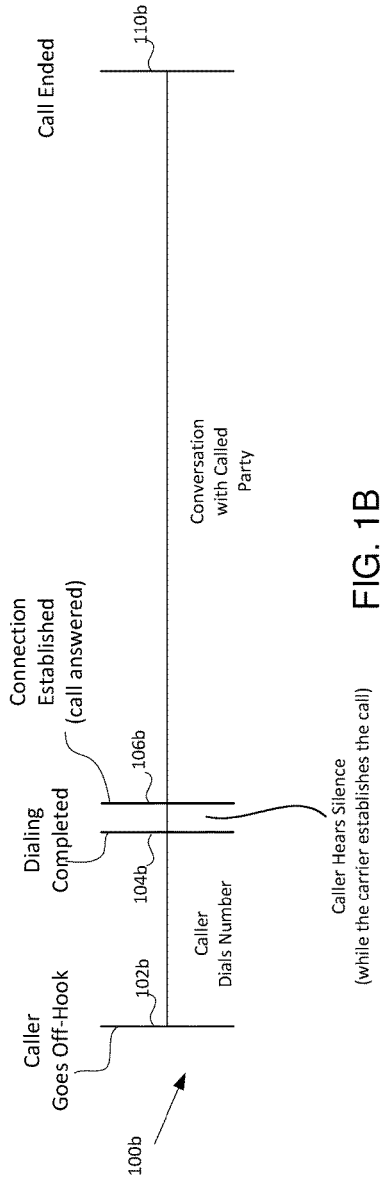
FIG. 1A (Prior Art)
FIG. 1B (Prior Art)

TELEPHONE CALL PROCESSING MODIFICATIONS RELATED TO CALL ACCEPTANCE FOR AN INCOMING CALL RECEIVED AT A CONTACT CENTER

RELATED APPLICATIONS

This application is a continuation of U.S. patent application Ser. No. 14/959,544, now U.S. Pat. No. 9,560,210, filed on Dec. 4, 2015, entitled "Telephone Call Processing Modifications Related to Call Acceptance for An Incoming Call Received at a Contact Center," the contents of which are incorporated by reference for all that it teaches.

FIELD OF INVENTION

The field of the invention generally pertains to processing voice telephone calls by a call handler in a contact center. Specifically, the invention pertains to how the timing of call acceptance by the call handler can be modified in conjunction with other operations performed by the call handler that include ascertaining agent availability in light of information conveyed by the call establishment signaling.

BACKGROUND

The steps of establishing a conventional telephone call are well known. For contact centers receiving and answering an incoming telephone call, additional steps may be required after answering the call. This may involve ascertaining which group of agents are best suited to handle that incoming call and whether any agent within that group is available to accept the call. This determination may be made based on the dialed number. Frequently, different called telephone numbers may be allocated for different functions (e.g., customer service, billing, reservations, etc.). Thus, in contact centers, determining which agent the caller should be routed may occur after the call is answered. For example, upon receiving an incoming call, the call handler may answer the call and then determine if an appropriate agent is available. If an agent is available, then the call is routed to the agent. If an agent is not available, then the call may be connected to an announcement system, or an announcement may be otherwise be played to the caller, informing the caller that an agent will be available shortly.

This method of operation may result in performing the functions of answering the call and then determining how to route the call serially. Because automated call processing equipment is involved, there is little time delay between receiving the call, answering the call, and routing the call. Conventional wisdom is that answering the call as quickly as possible is desirable. Once the call is answered, this triggers billing by the carrier and establishes a bi-directional voice path between the calling party and the call handler. An agent may not be available to accept the call, and is so, the caller may hear music on hold or an announcement. However, this occurs after the call is answered and thus, billing is started before there is a need for the bi-directional voice path to allow communications with an agent. Accordingly, it is with respect to this and other considerations that the disclosure herein is presented.

BRIEF SUMMARY

Technologies are generally presented herein pertaining to systems, methods, and non-transitory computer readable media for processing an incoming call from a voice carrier by a call handler in a contact center. In one embodiment, the call handler uses information provided in conjunction with a call establishment request to ascertain a queue for the incoming call before the call is answered. The call handler starts a call acceptance timer after the call establishment request is received. Next, a determination is made by the call handler whether an agent associated with an appropriate queue is available to handle the incoming call. If an agent is available, then the call acceptance timer is stopped, the incoming call is answered, and is connected to the available agent. If an agent is not available and the call acceptance timer expires, then the call is accepted upon expiry of the call acceptance timer. In one embodiment, an announcement may be played to the calling party prior to call acceptance. Accepting the call involves sending a message to the carrier that establishes a bi-directional audio path as well as commencing billing of the call. In this manner, by incorporating a call acceptance timer, certain application level call handling operations that determine how an incoming call should be routed or processed can occur prior to accepting the incoming call from the carrier.

BRIEF DESCRIPTION OF THE DRAWINGS

Reference will now be made to the accompanying drawings, which are not necessarily drawn to scale, and wherein:

FIGS. 1A-1B reflect the prior art and show embodiments of various stages that may occur with the establishment of a conventional telephone call.

DETAILED DESCRIPTION

Figure 2:
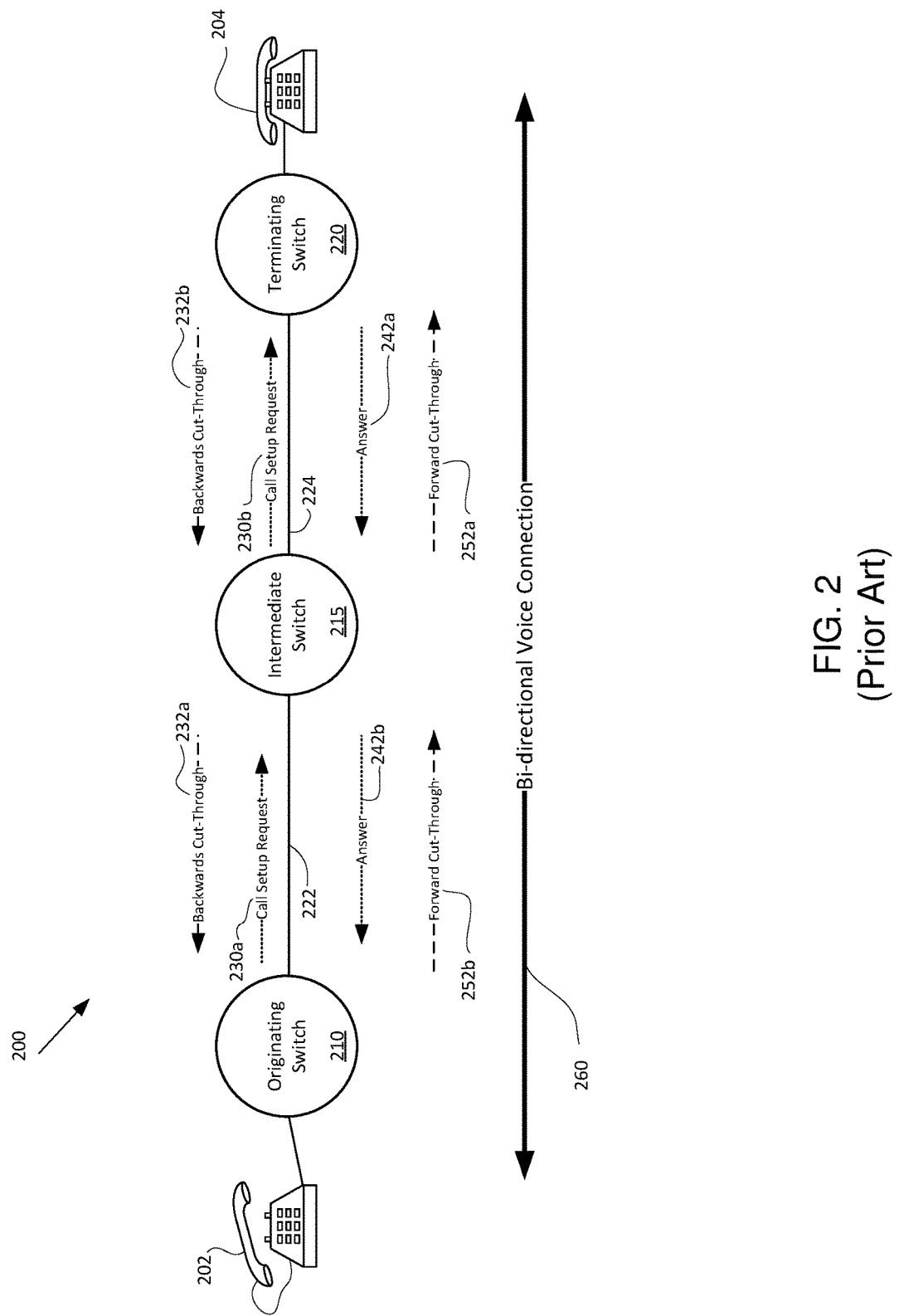
FIG. 2 reflects the prior art of how audio paths on trunks may be managed in a voice communications network in conjunction with the establishment of a voice call.

Various embodiments for practicing the technologies disclosed herein are described more fully hereinafter with reference to the accompanying drawings, in which some, but not all embodiments of the technologies are shown. Indeed, the embodiments disclosed herein are provided so that this disclosure will satisfy applicable legal requirements and should not be construed as limiting or precluding other embodiments from applying the teachings and concepts disclosed herein. As will be evident, there are a number of variations on the embodiments disclosed herein, but which are based on similar concepts and goals. Like numbers in the drawings refer to like elements throughout.

In conventional contact centers, a call handler may receive a call from a carrier, answer the call, and then ascertain how to route the call accordingly. It is possible to alter the sequence of events so that an incoming call request is received by the call handler, and before it is answered, the call handler ascertains how the call should be processed. Only after this is determined does the call handler then answer the call. If during the time the call handler ascertains how the call should be processed, an appropriate agent is available, the call handler can answer the call and route the call to that agent. If an agent is not available, then call handler may defer answering the call for a brief time period until an agent is available, or a call acceptance timer expires. The call acceptance timer ensures that deferring the answering of the call is limited, because it is possible that deferring answering of the call past a certain point will cause the call to be abandoned or terminated.

The impact on the calling party's experience is not necessarily significantly altered by deferring call answering. In fact, deferring answering the call briefly while waiting for an agent to become available may, in some circumstances, improve the caller's experience. In some cases, it is possible to avoid connecting the caller with an announcement to wait for an agent and billing time for the call can be reduced.

For a conventional telephone call, the caller actions and corresponding stages associated with originating the call are well known. These are depicted in FIG. 1, which depicts the prior art. Turning to FIG. 1A, a timeline 100a is shown that depicts the duration of a call originated by the calling party. It starts when the caller goes "off-hook" 102a and ends when the call is terminated or ends 110a.

The call begins when the calling party goes "off-hook" in step 102a. This refers to when the user lifts the handset from the cradle, although modern phones may not have a conventional handset and/or cradle. At this point the caller may hear dial-tone, which is provided by the serving telephone switch. Next, the caller enters the telephone number to be called during the dialing phase 103a. Dial tone is removed in response to receiving the first telephone digit. When the dialing is completed in step 104a, the telephone network then sets up the call. During this time, which is referred to as the call establishment phase 105a, the calling party may hear silence or "clicks" while the call is being established (although this is less likely to occur today in modern telephone networks). Once the call is offered to the remote switch, the calling party will hear an alerting sound (a.k.a. ringing, alerting, or ring-back). This may be referred to as the alerting phase 107a. The ring-back sound indicates to the calling party that the phone at the remote end is ringing. Typically, in the United States, the ring-back sound that the calling party hears is provided by the remote serving telephone switch. The number of rings that the calling party hears depends on how quickly, if at all, the called party answers the phone. Once the called party answers, the ring-back sound is removed and a bidirectional voice path is established. Typically, the ringing is characterized by a cadence of four seconds of ringing, followed by two seconds of silence. This is called a "ring cycle" and is six seconds long.

It is not unusual for the phone to ring for a number of ring cycles before the called party answers the phone. Obviously, the time it takes for the called party to answer the phone is variable. Once the called party does answer the phone at step 108a, the call is considered in the active or connected phase 109a. At this point, a bi-directional voice path is established end-to-end and the parties may converse with each other. Further, because a connection is now establish end-to-end, billing of the call commences. Typically, the calling party is billed for the call in some manner, but if the calling party has dialed a toll-free ("800" number), then the bill is rendered to the called party. Many call centers receive calls on toll free numbers and hence are billed for the incoming calls.

Presently, calling parties have become accustomed to encountering voice mail or answering machines, and thus expect to hear a limited number of ringing cycles before a call is answered. Because many answering machines and voice mail services are configured to answer within four ring cycles, callers expect the call to be answered either by a live person or picked-up by an answering device by the end of four ring cycles. Thus, if voice mail or an answering machine does not pick up, callers will often abandon the call after five or more ring cycles and assume that the called party is unavailable to answer the phone.

In times past, the call establishment phase may have taken several seconds as telephone signaling progressed from switch-to-switch. It was not uncommon in the past for the calling party to hear various in-band clicks and other spurious sounds during the call establishment phase. With the advent of Signaling System Number 7 ("SS7"), the call establishment phase is much shorter. Because this is an out-of-band signaling architecture, there are no in-band clicks heard. It may only take a second or a fraction of a second to reach the alerting phase. Once alerting occurs, the calling party can be expected to wait at least four ring cycles before abandoning the call. Thus, reaching the alerting phase is frequently much faster now, than in days past.

Callers have also learned to expect slightly different treatment based on the type the call being made. For example, in the above example, a residential wireline-to-wireline call will quickly enter the alerting phase and it may ring for several ring cycles. However, when a calling party calls a business, such as a contact center identified by a toll-free telephone number, the telephone calls are typically answered by a computerized processing device, as opposed to a human picking up a phone. Thus, the alerting phase is relative short. Often, call handlers will accept an incoming call immediately, without triggering the alerting phase. Thus, the caller will not necessarily even hear a ring-back tone.

In this case, the progression of the call may be slightly different, as is shown in the prior art figure of FIG. 1B. Turning to FIG. 1B, this timeline 100b illustrates a call that begins with the calling party going off-hook at step 102b. The dialing phase is then entered, and the person dials the number. Once dialing is completed at step 104b, the telephone carrier, which may be a conventional telephony common carrier, a voice over IP ("VoIP") provider, or some other type of telecommunications provider, establishes the call to the called party.

During the call establishment phase, the calling party will hear silence, but typically this is a relatively short time period, especially in light the widespread deployment of SS7. Once the call is offered to the remote entity, such as a contact center, the equipment often immediately answers the call at step 106b. The alerting period may be short or nonexistent because the contact center uses computer processing equipment to answer the call. In other words, there is no person waiting for a phone to ring that then answers the phone (as in a residential calling context). While an alerting sound may be provided to the calling party, it is typically for less than a full ring cycle. If such a short ring cycle is provided, this may be provided by the call center simply to reassure the calling party that the call has reached the intended destination.

Once a contact center call handler answers the call, it is well known in the prior art that it may connect the calling party to an agent (if available), or it may connect the caller to an interactive voice response unit ("IVR"), an announcement system, or other device which plays a recorded announcement or music to the called party. As used herein, "connecting the caller" and "connecting the call" refer to the same actions taken in the call handler to complete the call. It is understood that, "call" is synonymous with "caller" in this context. Further, since the call is further processed leading in a connection with an agent, this may all be referred to as "routing the call to the agent", "routing the caller to the agent", or "connecting the call(er) to the agent".

Thus, when calling a business or contact center, the calling party will typically encounter a very short call establishment and alerting phase. After dialing is completed and the call is offered, the contact center will normally answer the call very quickly. In fact, even though the calling party is quickly connected to the contact center, in practice, the calling party would have likely waited nonetheless during the alerting phase, even if it took a few seconds more (or another ring cycle) before the call was answered. In other words, even though the calling party may expect the call to quickly connect, the calling party is accustomed to wait a number of ring cycles, so that even if the call were to take slightly longer to connect with a contact center, the calling party would likely not abandon the call. In other words, the calling party will tolerate some additional delay during the call establishment phase, and will likely wait a short time during the alerting phase. However, once the call reaches the alerting phase, if the call is unanswered after four ring cycles, a caller may abandon the call.

Frequently, once the contact center has answered the call, it will connect the call to an IVR, which informs the caller that there may be a wait before an agent will be available. This creates an ironic situation of where technology has been improved so that the call can be quickly established, but result is that the caller has to then wait for an agent. This situation is reflected by the adage "hurry up and wait." As will be seen, the timing of these call phases can be altered somewhat with respect to one another without increasing the net time that it takes for the calling party to connect with a live agent. This modification to the call processing timing allows the contact to perform certain call processing functions in parallel with the call offering, but prior to the call being answered. This also provides the benefit of reducing the billable time for the call.

In order to understand how the concepts and technologies disclosed herein can accomplish this, it is first necessary to review how telecommunication facilities (a.k.a. "trunks" or "channels") are established end-to-end in a telephone network. Although voice calls require a bi-directional audio path, they can be controlled or modeled as two one-way audio paths. That is, a conventional voice call requires audio from either party to be conveyed back to the other. This can be viewed as a first one-way voice trunk from the calling party to the called party, and another one-way voice trunk from the called party to the calling party. As will be seen, these one-way audio paths are frequently established independently of each other on a given call.

This can be explained with the help of the prior art diagram of FIG. 2. FIG. 2 shows a calling party at telephone 202 attempting a voice call to the called party's telephone 204. The calling party goes off-hook and dials the called party's telephone number. The originating switch 210 receives the digits and sends a call setup request 230a over a communication trunk 222 to an intermediate switch 215. Once that is established, the intermediate switch 215 will enable that trunk to convey audio back to the calling party.

This enablement of a voice path is called a "backwards cut-through" 232a, as it opens the trunk (i.e., "cuts-through") to allow in-band tones or ring-back tones to be provided as necessary to the originating party (i.e., backwards with respect to the progression of the call). Next, the intermediate switch 215 relays the call setup request 230b to the terminating switch 220. Similarly, the terminating switch 220 will enable the trunk 224 to convey audio, i.e., also perform a backwards cut-through 232b.

The terminating switch typically provides the in-band ring-back tone that the calling party hears. Because the particular terminating switch is not known in advance as the call progresses, each intermediate switch will perform the backwards cut through. This allows the terminating switch, once encountered, to provide the ring-back tone all the way back to the calling party. This requires that a reverse audio path is established from the terminating switch 220 back to the originating switch 210. When there are multiple switches involved in a call, the steps are done on a switch-by-switch basis.

At this time during the call establishment, the terminating switch will apply a ringing voltage to the line of the called party's telephone, causing it to alert or ring. During this time, there is no possibility of any audio from the calling party to be conveyed to the called party, because the called party has not answered the call. Specifically, there is no forward cut-through path established allowing the calling party to send audio to the called party.

Once the called party lifts the receiver (e.g., telephone 204 goes off-hook) and answers the call, the terminating switch will send an answer messages 242a to the intermediate switch 215. The intermediate switch in turn will open or enable the audio path to the terminating switch, shown as the forward cut-through 252a. Next, the intermediate switch 215 will relay the answer 242b back to the originating switch 210. The originating switch will then also perform a forward cut-through 252b. At this point, there is a bi-directional voice connection 260 established between the calling and called parties.

One important point to glean from FIG. 2 is that the in-band ring-back alerting sound that the calling party hears during the alerting phase is provided by the terminating switch 220. This requires an established audio path in the backwards direction, all the way back from the terminating switch to the calling party. However, there is no forward audio path established until the called party answers the call. Although there is a backwards audio path established during the alerting phase, the call is not connected or answered. Further, once the call is answered, it is only then that billing for the call starts.

Those skilled in the art will recognize that there are a variety of conventional and non-conventional protocols that can be used to establish an end-to-end voice path, including various conventional telephony protocols and various VoIP based protocols. Thus, FIG. 2 is not intended to limit application of the principles herein to any particular signaling system.

Typically, when a contact center receives a call, the process shown in FIG. 2 is performed. An end-to-end voice connection is established with the contact center when the call handler answers the call. Then, after it is answered, the call handler can connect the call to an agent or play an announcement, as appropriate. In order to connect the call to an agent, the contact center has to ascertain what number was dialed, what group of agents is assigned to service such calls, and the status of the agents in that group. Once all this is done, the call can be transferred to the agent, if one is available. If, however, an agent is unavailable, the call may be routed to an announcement system where the calling party may be asked to wait for the next available agent. Once an agent is then available, the call is transferred from the announcement system to the agent.

Once the contact center has answered or accepted the call, carrier billing is started. This means that the time taken by the contact center after answering the call, namely to ascertain the appropriate agent group, agent availability, and routing of the call to the agent, is included in this billing time. However, during this time when the call handler is ascertaining the agent status, when there is, in fact, no communication between the agent and the called party.

The contact center may be using a reverse-charging service, such as "800" toll free number. The billing of this call is rendered to the called party and starts when the call is answered. Thus, the contact center may be answering the call and paying for the call, when at this time the call handler may not have ascertained how to connect the incoming call or there is no agent currently available to speak with the calling party. It is possible that the call handler could perform these processing functions prior to establishment of a connection, while the call is in the call establishment or alerting phase. Thus, the call handler could actually delay the connection establishment (e.g., answering of the call) while it determines how to process the call or waits for an agent to become available.

In fact, if an agent is unavailable, the call handler could delay answering the call for short time, rather than connecting the caller to an announcement, if it is likely that an agent will be available shortly. The caller may not readily notice or object to the delay, and doing so would reduce the carrier charges to the contact center. In fact depending on the relative time periods of the call establishment phase and the alerting phase, the caller may not be adversely impact by the delay.

Contact Center Environment

Figure 3:
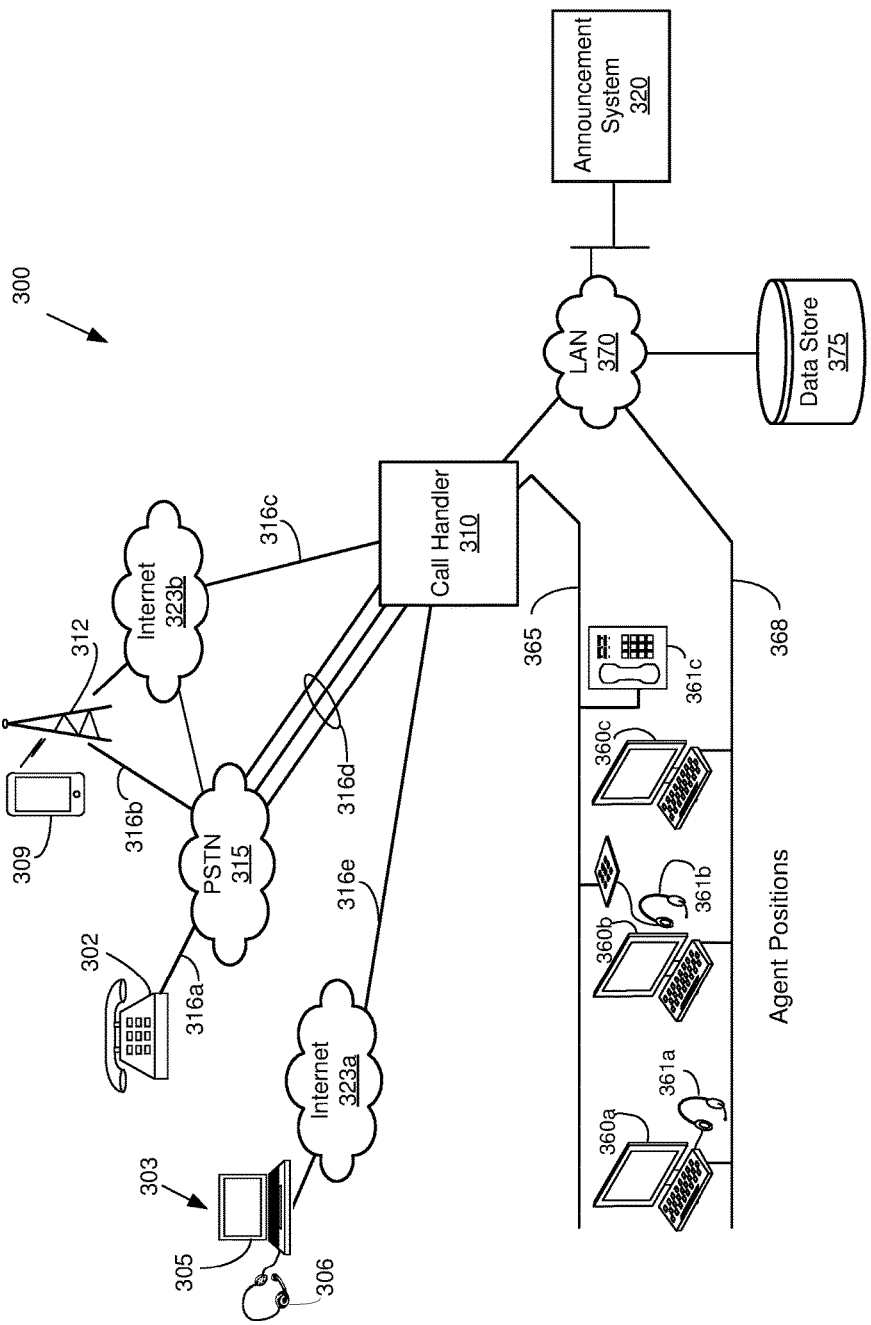
FIG. 3 illustrates one embodiment of a call handler in a contact center that accepts voice calls consistent with the concepts and technologies disclosed herein.

FIG. 3 illustrates one embodiment 300 of a contact center with a call handler 310 implementing the concepts and technologies disclosed herein. Since the contact center may handle calls originating from a calling party, the term "party" or "remote party" without any further qualification, refers to a person associated with a call handled by the contact center, where the call is either received from, or placed to, the party. In most cases herein, it will be referring to a call originating from the calling party and received by the call handler (i.e., an incoming call to the call handler). Depending on the embodiment, inbound voice calls may originate from a calling party that may use a variety of different phone types. For instance, the calling party may originate a call at a conventional analog telephone 302 connected to a public switched telephone network ("PSTN") 315 using an analog plain old telephone service ("POTS") line 316a. The call may be routed by the PSTN 315 and may comprise various types of facilities 316d, including, but not limited to: T1 trunks, SONET based fiber optic networks, ATM networks, IP-based facilities, etc. Various types of routers, switches, bridges, gateways, types of equipment, protocols, and signaling interfaces may be involved in the processing of the calls.

Inbound communications may also be received at the call handler 310 from the individual's smart phone device 309, but the remote party's device could also be a mobile phone, tablet, or other mobile device, which wirelessly communicates with a mobile service provider ("MSP") 312. The voice calls may be routed to the PSTN 315 using an integrated services digital network ("ISDN") interface 316b or other types of signaling interfaces that are well known to those skilled in the art. The ISDN interface may be a Primary Rate Interface ("PRI"), which comprises 24 channels—one signaling or D channel, and 23 bearer or "B" channels. The ISDN interface is defined by a protocol referred to as Q.931, which is a standardized protocol. The ISDN protocol may interwork with the Signaling System No. 7 ("SS7") protocol that is well known by those skilled in the art, and may convey information as to why a call was unable to be offered to the remote interface. This information may be conveyed back to the call handler 310 using the ISDN protocol on the ISDN signaling interface 316d.

In particular embodiments, the MSP 312 may also route calls as packetized voice, also referred to herein as voice-over-IP ("VoIP") or as "SIP" (session initiation protocol) calls to/from an Internet provider 323b using Internet-based protocols. For convenience, unless indicated otherwise, the term "trunk" refers to any type of facility 316c, 316d, or 316e providing communication to, or from, the contact center, regardless of the type of protocol or technology used. Specifically, a "trunk" is not limited to time-division multiplexing ("TDM") technology, but may include packetized or other types of data oriented technology. Inbound communications calls may also originate from a called party employing a so-called "IP phone," "VoIP phone," or "soft phone" 303. In one embodiment, this device may comprise a computing device 305, such as a laptop, computing tablet, or other electronic device, which processes voice data and interfaces with a headphone/microphone combination, also referred to as a headset 306. The computing device 305 may in turn be connected to an Internet provider 323a. Those skilled in the art will recognize that a variety of protocols and facilities may be used to convey voice calls and a variety of VoIP phone embodiments. In various embodiments, gateways or protocol converters may be involved to interwork between the various signaling protocols.

In some embodiments, a call handler 310, may be an automatic call distributor ("ACD"), Private Branch Exchange ("PBX") or other similar switching device, used to receive inbound calls and route them to agents. An ACD may receive calls at multiple telephone numbers (including toll free numbers) simultaneously, with various queues for agents that are assigned to handle those calls. The queue may be identified by various toll free numbers that are assigned for different purposes. Further, on incoming calls, information about an account (e.g., calling party) may be displayed to an agent to review during the call. In this way, when the agent answers the phone, the agent can interact with the individual in an effective way. The call handler 310 may also receive a call and play an announcement, or connect the call to an interactive voice response system (not shown) which plays the announcement. The call handler 310 also incorporates or may comprise a dialer that interfaces with a plurality of ISDN PRIs 316d to the PSTN 315.

The call handler 310 may be configured so that it accesses data associated with an individual using telephone numbers stored in a data store 375. For example, incoming calls will be delivered using a calling party number that the call handler can use to query the data store 375. This data may inform the call handler of a particular queue, set of agents, or agent status, which can be used in processing the call. The call handler 310 may connect the call to an available agent by connecting the outbound call leg to the called party with another call leg that has been established to an available agent using contact center communication facilities 365. Appropriate data associated with the calling party may appear on that agent's computer display, which is also stored in the data store 375. Other embodiments may connect the call to an IVR or announcement system 320. Depending on the embodiment, the facilities 365 may be any suitable technology for conveying the call, including but not limited to a local area network 370 ("LAN"), wide area network ("WAN"), ISDN, or conventional TDM circuits.

In other embodiments, the incoming call leg may be connected to a call leg established to the agent's phone using a local network 370 over facilities 368. The exact details typically depend in part on the technology used. For example, the facilities 365 may be, in one embodiment, analog or digital voice communication technology whereas facilities 368 may be, e.g., SIP or VoIP H.225, H.323 signaling. As may be appreciated, there are various technologies, protocols, and configurations that are possible.

An agent typically uses a computing device 360a-360c, such as a personal computer, and a voice device 361a-361c. The combination of computing device 360a-360c and voice device 361a-361c may be referred to as a "workstation." In many instances, the computing device also handles VoIP so that reference to the "computer workstation" or the "agent's computer" may refer to the computer processing device of the workstation, that may be closely integrated with handling voice as well. Thus, for these particular embodiments, the workstation can be assumed to have at least a data capability and may have a voice capability.

Depending on the embodiment, the interaction between the call handler 310 and agent computers 360a-360c, as well as other components, may involve using the local area network ("LAN") 370. In particular embodiments, when an agent is interacting with the called party, the agent may use their computer 360a-360c to further interact with other enterprise computing systems, which may provide account level information to the agent. Typically, when a call handler connects the agent to an outbound call leg, data may also be presented to the agent using the agent's computer using facility 368. This may provide information about the called party, such as their associated account related information.

Although a number of the above entities may be referred to as a "component," each may also be referred to in the art as a "computing device," "unit", "server", or "system." A component may incorporate a local data store and/or interface with an external data store. Use of the word "server" does not necessarily require the component to interact in a formal web-based client-server arrangement with other components, although that may be the case. Further, the above components may be located remotely from (or co-located with) other components. Furthermore, one or more of the components may be implemented on a single processing device to perform the functions described herein. In addition, the contact center architecture 300 may be provided as a hosted solution, where the call processing functionality is provided as a communication or software service (a so-called "communication-as-a-service" ("CaaS") or "software-as-a-service" ("SaaS")) to a contact center operator. Thus, there is no requirement that the components identified above must be actually located in a contact center location or controlled by a contact center operator. In addition, depending on the embodiment, the agent positions may be remotely located from the other components of the contact center, sometimes referred to as a "virtual contact center." Those skilled in the art will recognize FIG. 3 represents one possible configuration of a contact center architecture 300, and variations are possible with respect to the protocols, facilities, components, technologies, and equipment used.

Call Handler Architecture

Figure 4A:
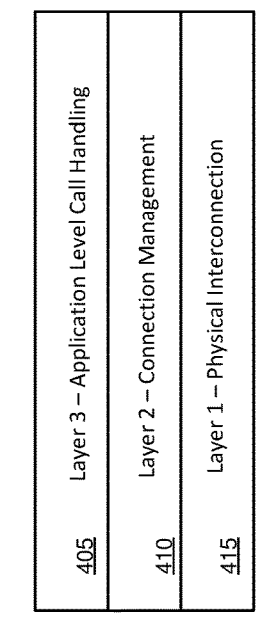
FIGS. 4A-4B illustrate one embodiment of a call handler practicing the concepts and technologies disclosed herein.
Figure 4B:
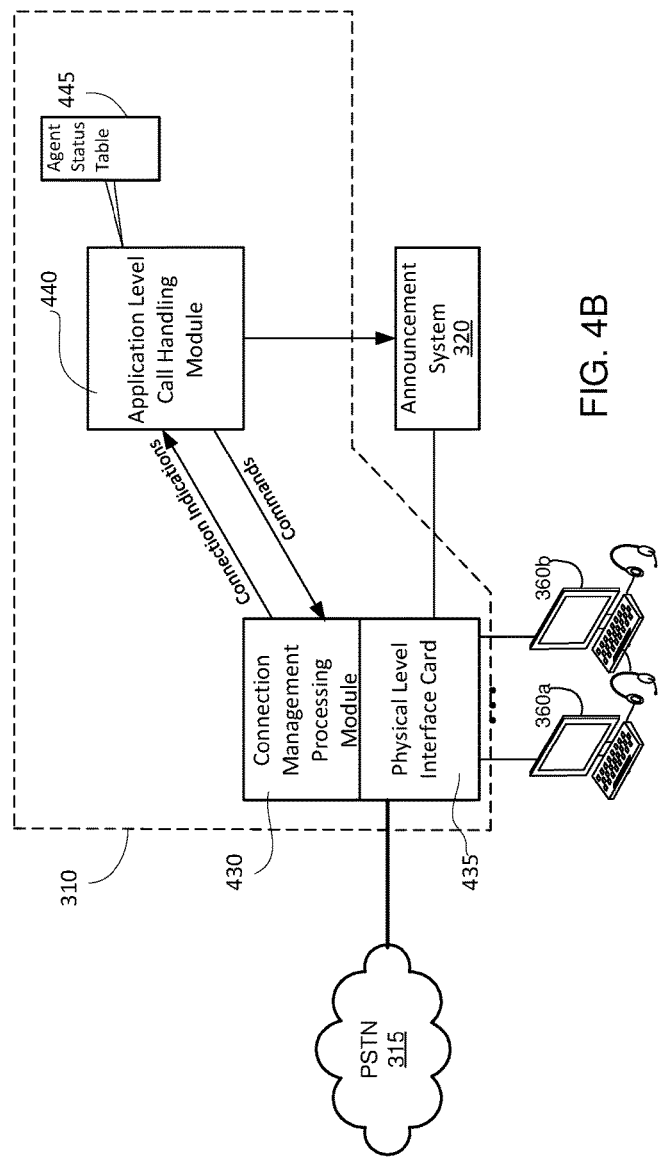

The modification to the call processing typically involves the call handler 310 of FIG. 3. FIGS. 4A and 4B are used to illustrate at a high level one embodiment of the architecture of the call handler 310 for accomplishing the concepts disclosed herein. Referring to FIG. 4A first, this embodiment can be described using a protocol model 400 that shows how various functions are segregated. These are described as "layers" and in concept is similar to the Open Systems Interconnection ("OSI") model typically used by those skilled in the art to describe protocols and how components in a system may interact and communicate.

In FIG. 4A, the model 400 is shown as having three layers. The first layer 415 handles aspects related to physical interconnection, and is sometimes referred to as the "physical layer." This defines the various electrical signaling aspects, connectors, bit-level definitions for conveying information, wires, voltages, etc. This may include aspects related to how the physical characteristics of a call are handled, whether it be in accordance with one of various technologies, such as VoIP, ISDN, plaint old analog telephony, etc.

The next layer 410, layer 2, is the connection management layer which handles the establishment of a call, answering the call, transferring the call, terminating the call etc. In essence, this governs the management of telephone connections, hence the name "connection management layer." The actions performed at this layer are typically dependent on whether the underlying call handling protocol in layer 1 415 is ISDN, VoIP, H.323, or some other call handling protocol. Essentially, this layer performs protocol operations for signaling a call, accepting a call, terminating a call, etc.

The next layer 405, layer 3, is the Application Level Call Handling layer. This includes functions and operations that determine how to process information associated with a call. For example, a call may be received at layer 2, but processing at that layer may not know what to do with the call (e.g., route it to an agent or connect to an IVR). Thus, layer 2 could "ask" layer 3 what should be done with the call. Layer 3, may direct layer 2 to answer the call and then to connect the call to a particular agent. Thus, the Application Level Call Handling layer may monitor the status of various agents, ascertain the function of the call based on the telephone number dialed, ascertain who is calling, and direct Layer 2 to route the call to a particular available agent.

The illustration in FIG. 4A is only a model that is useful in explaining the implementation of the functions as they relate to processing a call according to the concepts disclosed herein. Other models could be used to describe potential implementations. For example, other implementations may implement a monolithic model, where all functions are integrated and are not segregated into layers. It is even possible to implement or practice the concepts herein without having to implement any type of layered model. The model's main function is to explain the concepts and technologies used to practice the invention.

In the prior art, a call handler may comprise separate components that accomplish functions for layer 1 and layer 2 together that is separate from layer 3. Layer 1 functions involve processing signaling related the presence of a call according to a specific protocol. Layer 2 functions involving performing functions such as signaling call-related actions. Once the call is answered, then another component comprising the Application Level Call Handling layer (layer 3) may be queried, and it may then direct what should happen with the call. This conventional scheme, however, can be altered to maximize efficiency. In essence, the Application Level Call Handling layer can be informed about the presence of an incoming call before the connection management layer answers the call. In other words, rather than process call related information at each layer in a serial manner, information about a call can be performed in a parallel manner at these layers.

FIG. 4B illustrates one embodiment of how this can occur. In FIG. 4B, the call handler 310 is shown as having various modules, which may be combinations of interface cards, hardware, software, etc. The call handler 310 receives a call from the PSTN 315 in this embodiment at a physical level (i.e., layer 1) interface card 435. This could involve using, e.g., an interface card that interfaces with an ISDN PRI or VoIP SIP signaling. In other embodiments, other protocols could be used, which may not require a specific interface card.

The physical level interface card 435 receives the signals from the PSTN indicating a call is being offered. It is closely coupled with a connection management processing ("CMP") module 430 that controls certain aspects of the processing of the call, including various signaling messages. The CMP module 430 may send indications of call request that are being processed to the application level call handling ("ALCH") module 440, which is a layer 3 module controlling what happens to the call. Typically, the ALCH module does not accept or process the audio itself of the incoming call, but rather directs the CMP module as to how the call should be routed or controlled. For example, the call could be accepted, rejected, or routed to one of the agent stations 360a, 360b. This is accomplished by the ALCH module 440 sending the appropriate commands back to the CMP module 430.

For example, an incoming call may be initially processed by the physical level interface card 435 and the CMP module 430. Before the CMP module 430 sends an answer message (e.g., answers the call), it can ask the ALCH module 440 what to do with the incoming call. This allows the ALCH module to ascertain the purpose of the incoming call, the appropriate queue, the status of agent resources for that queue, etc. To aid in accomplishing this, the ALCH module may maintain a table 445 in memory indicating the status of which agents are available in each queue. The ALCH module 440 can then instruct the CMP module 430 to wait in answering the call, and during this time the ALCH can allocate resources in anticipation of the call being answered. It is even possible that the ALCH module can instruct the CMP module to establish a connection to the announcement system 320 or a particular agent before answering the call, so that when the incoming call is answered, it can be readily connected to that resource or is already connected to the resource.

In other embodiments, the ALCH module can instruct the CMP module to defer (i.e., wait) for a while before accepting (answering) the incoming call. Or, the CMP module may incorporate a default process to defer answering the call for a set time, or wait until informed by the ALCH module. This may require the CMP module to send certain messages to defer call acceptance. The particular messages sent may depend on the type of interface that is used to the PSTN. More will be discussed in this regard later.

In some conventional prior art systems, the call is received and answered by the CMP module and then the ALCH module is informed about the existence of the call. Doing so does not allow the ALCH to ascertain how to direct the call before it is answered. This means that the call is answered, billing is initiated, and then the ALCH ascertains what should be done with the call. In one embodiment of the present invention, the ALCH module is informed of the existence of the call prior to the CMP module answering of the call, and the ALCH can determine if there is an agent is available prior to the call being answered. Answering the call may be deferred for a limited time, while the ALCH determines whether an agent is available. However, there is usually a limit for how long the call may be deferred.

Although FIG. 4B illustrates one embodiment of the call handler, in other embodiments, the call handler could be a monolithic component or module, without any separation of the ALCH module and the CMP module. Those skilled in the art will recognize that there are a variety of ways the concepts and technologies disclosed herein could be implemented.

Process Flows

Figure 5:
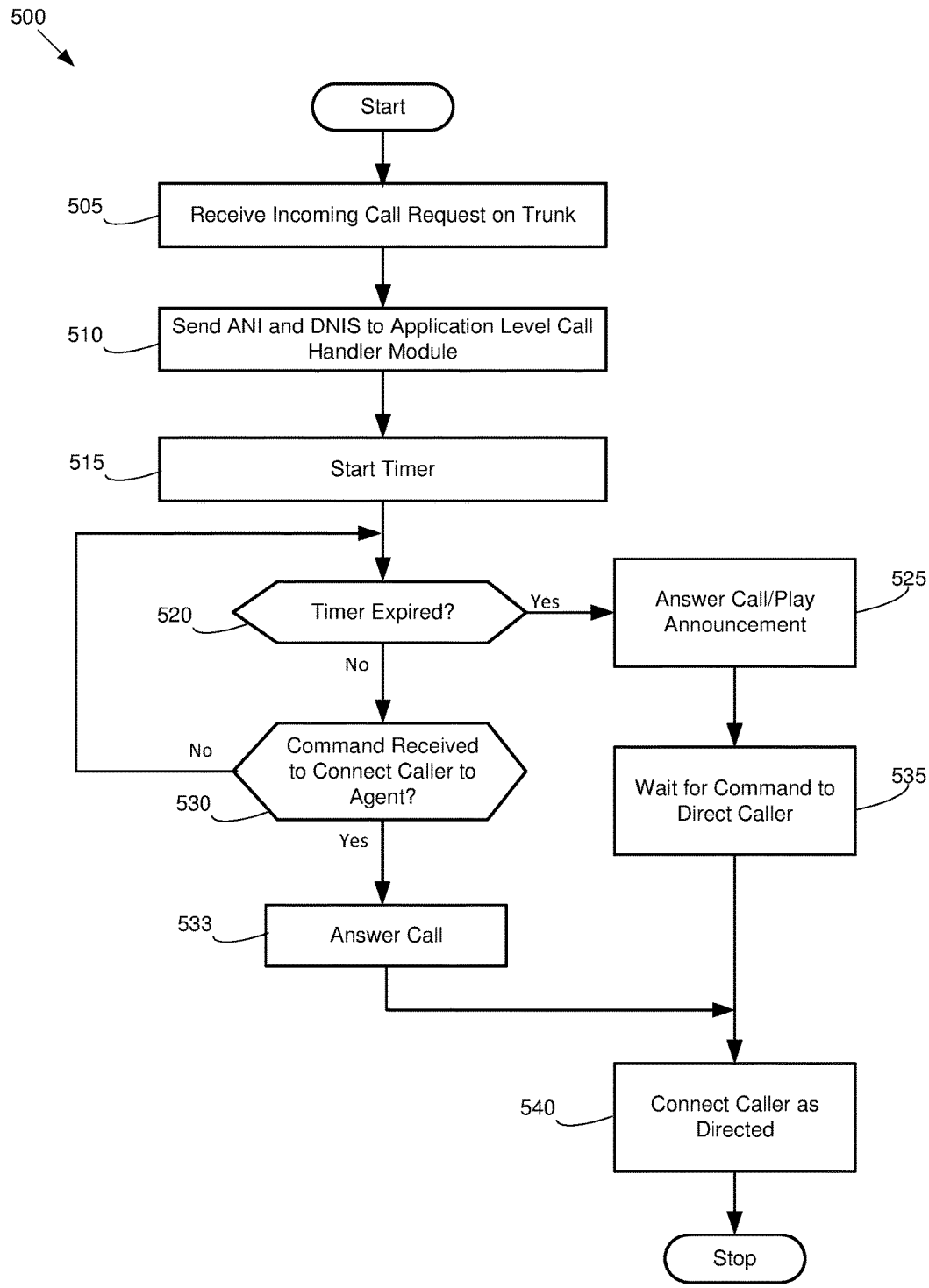
FIG. 5 discloses one embodiment of a process flow by a Connection Manager Processing module practicing the concepts and technologies disclosed herein.
Figure 6:
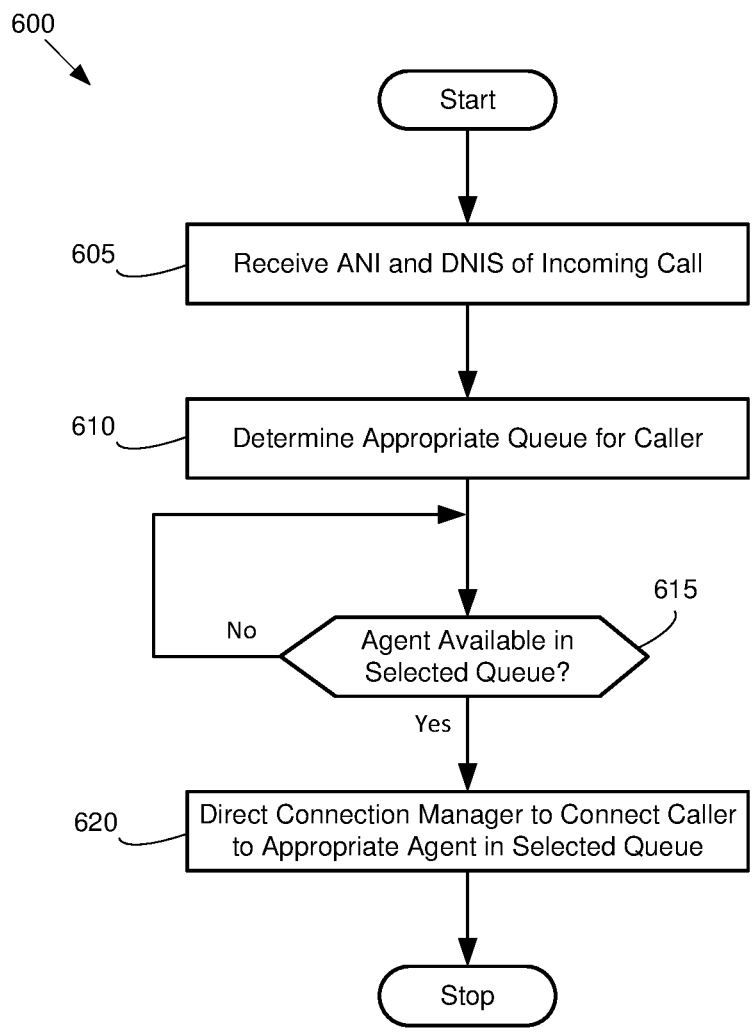
FIG. 6 discloses one embodiment of a process flow by an Application Level Call Handler module practicing the concepts and technologies disclosed herein and in coordination with the process flow of FIG. 5.

The process flows shown for one embodiment are shown in FIGS. 5 and 6. The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Turning to FIG. 5, FIG. 5 illustrates one embodiment of a process flow 500 associated with the combined CMP module and physical level interface card. It begins with an incoming call being offering on a communications facility (or trunk) in operation 505. This is manifested by messaging that conveys the calling party number (a.k.a. as automatic number identification or "ANI") and the number dialed by the calling party (a.k.a. "called party number") or a dialed number information service (a.k.a. "DNIS"). The DNIS may be a value that is not the same as the number dialed, but has a one-to-one association with the number dialed. This may be applicable when the caller has dialed a toll free number and the carrier provides a DNIS which corresponds to the number dialed, but is not the actual number dialed. The ANI and DNIS are conveyed to the ALCH module in operation 510. The CMP will then start a call acceptance timer in operation 515. The purpose of the call acceptance timer is to ensure that the call is accepted and not deferred indefinitely or beyond a certain time, otherwise the carrier or calling party will abandon the call. This embodiment illustrates the call acceptance timer implemented in FIG. 5 as part of the CMP module, but those skilled in the art will recognize that the call acceptance timer could also be implemented process flow in the ALCH module, FIG. 6. If so, slight modifications to the flow in FIGS. 5 and 6 are required.

Thus, a test occurs in operation 520 as to whether the call acceptance timer has expired. If the call acceptance timer has not expired, then the flow proceeds to operation 530 where a second test is made to see if a command has been received from the ALCH to connect the caller to a particular agent. "Connect" in this context means to route the call or join the incoming call leg to another call leg. If no such command has been received, then the process then loops back to operation 520 where the process further waits for input indicating either the call acceptance timer has expired or a command is received to connect the call to an agent. Other embodiments could direct the call to an IVR or announcement system.

If a command is received in operation 530 to connect the call to an agent, then in operation 533 the call is answered and the call is connected (routed) as directed in operation 540. The process is then completed. On the other hand, if the call acceptance timer has expired in operation 520, then there is the danger that the call may be abandoned or released by the carrier. Thus, the process flow continues to operation 525 where the call is answered. The call acceptance timer ensures that the call does not accidentally remain in a pending, but unanswered state, too long, as there are timers in the carrier's switch which will cause the call to be released or the caller may abandon the call.

At this point (once the call is answered), a bi-directional audio path is established, but the calling party will not hear anything unless the call handler causes audio to be provided to the calling party. To avoid the calling party hearing silence, the call handler may route the call by default to an announcement system to play an announcement. The announcement may inform the calling party to wait and that an agent will be available shortly. Next, the system waits for a command from the ALCH to direct the call to an available agent once an agent becomes available. Once received in operation 540, the call is connected to the agent as directed.

Conventionally, the process flow would comprise the steps of receiving an incoming call in operation 505, answering the call, playing an announcement in operation 525, sending the ANI and DNIS to the ALCH module in operation 510, waiting for a command in operation 535, and connecting the call to an available agent in operation 540. Thus, in the prior art, there is no deferment of answering the call as determined by the call acceptance timer.

The incorporation of the call acceptance timer allows the call answering to be deferred while the ALCH waits for an agent to become available. Because this wait could be on the order of a minute or so, the call acceptance timer ensures that the call is answered within a defined time period so as to avoid an unintentional release of the call. Typically, the deferral of call acceptance is less than a minute, and typically on the order of 10-20 seconds. The exact value of the call acceptance timer depends on the particular call control protocol that is used, the carrier switch timer settings, and human factor design. For example, some carrier switches have timers set that allow a pending call to go unanswered for 25 or more seconds before the alerting phase is encountered. The setting of the call acceptance timer value may depend on various aspects, including determining the impact to the calling party's user experience. For example, even if the switch timers allow a wait of 25 seconds, the caller may abandon the call earlier than that if they do not hear a ring-back tone or announcement after 20 seconds.

Deferring the answering of the call may also impact the "Average Speed to Answer" ("ASA") metric. The ASA metric is used to measure how quickly incoming calls are answered by the call handler, and may be used as a gauge for measuring performance of the contact center in servicing calls. Thus, being able to defer answering the call while potentially waiting for the availability of an agent can serve to reduce the overall ASA value, and thus increase the measured call servicing performance of the contact center.

The corresponding process flow for the ALCH module is shown in FIG. 6. This process flow is designed to interact with the process flow shown in FIG. 5, as will be seen. The process begins in operation 605 where an indication of the ANI and DNIS of an incoming call is received from the CMP module. This essentially is an indication of a new incoming call that has been received and an implicit request for instructions for how the call should be routed.

In response, a determination is made for the appropriate queue to use for the call in operation 610. The appropriate queue selection may be based on the ANI and/or DNIS. For example, the DNIS may be used to distinguish a customer service call from a billing inquiry call. On the other hand, calls to customer service may use the ANI to distinguish a "gold-level" member from a "bronze level" member. A variety of techniques can be used to ascertain the appropriate queue and whether there are any available agents in that queue.

It is even possible that the DNIS could identify a particular agent. This could be viewed as the DNIS identifying a queue involving a set of only one agent. In this embodiment, the DNIS is still used to identify a queue associated with a group of agents, where the group may comprise one or more agents. It is possible that the ANI may or may not be used to further identify a sub-group or the group itself. In other embodiments, it is possible that if there are multiple calls waiting for that agent, that the ANI could be used as a means of ascertaining the priority of that caller relative to others.

Once the queue is determined, a test is made to see if there is an available agent in the corresponding queue in operation 615. If not, the process waits until an agent is available. Once an agent is available, then appropriate instructions are provided to the CMP module to connect the call to the appropriate agent in the selected queue in operation 620. As evident, the processing that occurs in the ALCH in this embodiment is to: receive an indication of the ANI and/or DNIS for an incoming call, determine how the call should be routed based on the ANI and/or DNIS, and inform the CMP module when an appropriate agent is available.

This embodiment does not show the call acceptance timer in the process flow, but the call acceptance timer could be incorporated into FIG. 6 such that the ALCH module controls the deferment of the call acceptance, as opposed to implementing the call acceptance timer in FIG. 5. If the timer were implemented in FIG. 6, then when either the timer expires or an agent is available, then an instruction is provided to the CMP to answer the call and route it accordingly (i.e., to an agent if one is available, to an announcement is one if not available). Regardless of where the timer is implemented, the ALCH module is informed of the incoming call and is able to ascertain the appropriate queue and identify the appropriate agent (if available) prior to answering the call.

Messaging Diagrams

Figure 7:
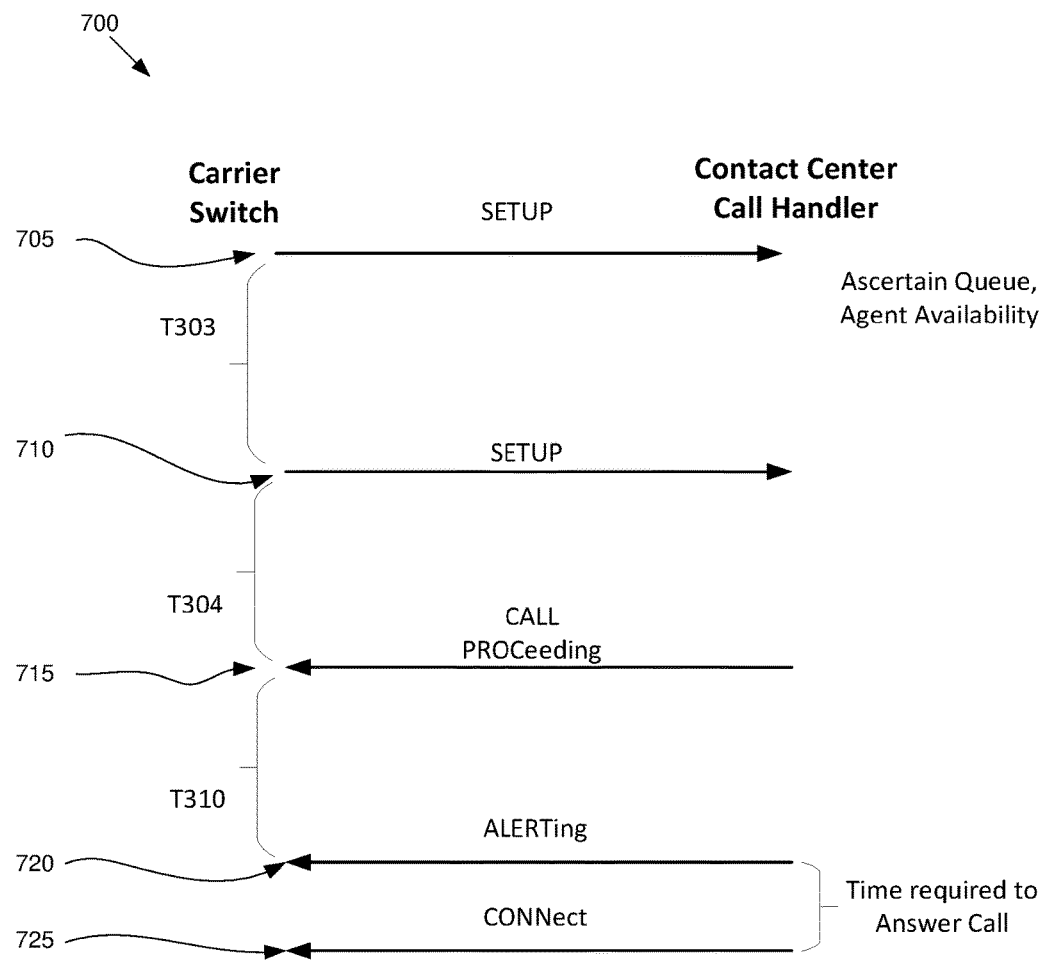
FIGS. 7-8 discloses embodiments of ISDN messaging flows for practicing the concepts and technologies disclosed herein.

FIG. 7 illustrates one embodiment of how conventional ISDN Q.931 protocol messaging can be used to defer call acceptance, in order to provide additional time for the ALCH module to ascertain queue and agent status. FIG. 7 illustrates the ISDN messaging between the carrier switch and the call handler and does not fully illustrate the internal processes that may occur within the various modules. In this embodiment, the ISDN messages are shown using conventional nomenclature, wherein certain letters may be capitalized. For example, the "ALERTing" is frequently shown with "ALERT" in uppercase, as it is commonly also referred to in an abbreviated manner as the "ALERT" message.

The process begins with the carrier switch offering a call to the call handler in step 705. This is a call SETUP message 705, which typically includes the calling and called party telephone numbers. When this message is sent, the carrier switch will start a timer, T303 which is typically 2-4 seconds in duration. This timer is stopped once a response is received, and if it expires, then another SETUP message will be sent.

Once the SETUP message 705 is received by the call handler, the called party number (and/or ANI) can be used to ascertain the queue and the appropriate agent status. The call handler would normally respond to this message with a CALL PROCeeding message, but if none is forthcoming and T303 expires, then the carrier switch will resend the SETUP message 710 and start timer T304. T304, which also is in the 2-4 second range, is started upon resending the SETUP message. If T304 expires, then the call is released. Thus, it is desirable to avoid having T304 expire. This can be accomplished by the call handler sending a CALL PROCeeding message 715 to the switch before the timer expires.

The CALL PROCeeding message 715 indicates that the call setup request has been received and the processing of the call setup request is proceeding. The switch will then start timer T310, which is the amount of time it will wait for an ALERTing message 720. Once the ALERTing message is received, the audio path to the calling party is cut-through, so that any in-band ring-back tones can be conveyed to the calling party. At this point, the calling party will then hear any ring-back tones provided by the call handler. Next, the call handler will send a CONNect message 725 to answer the call. This will start billing and establish a bi-directional voice path.

During the time between the first SETUP message 705 to the sending of the ALERTing message 720, a number of seconds may occur, depending on the value of the timers and when the call handler responds with a CALL PROCeeding. This may be 10-20 seconds, and is sufficient time for the call handler to ascertain how to process the call. However, this may still be an insufficient amount of time for an agent to become available. If no agent becomes available, the some action is required to avoid the call being abandoned. Thus, the call acceptance timer limits the amount of time which an agent will be waited on before the call handler answers the call.

Of course, once the ALERTing message 720 is sent, in-band ring-back tones can be provided to the calling party while the call handler waits for an agent to become available. In lieu of ring-back tones, an announcement could even be provided to the calling party, indicating to wait while an agent becomes available. With each ring cycle being 6 seconds, the calling party can be expected to wait for 1-4 rings cycles before abandoning the call. Thus, it is feasible that the sending of the CONNect message 725 can be delayed by at least one to two rings cycles before the calling party would abandon.

There are various other ISDN message flows that could occur to delay call acceptance. The flow in FIG. 7 is just one embodiment, and requires knowing how the carrier switch has set certain timer values, and relies on certain default ISDN error handling procedures. For example, the resending of the SETUP message is the default error handling procedure when a response to the first SETUP message is not received. Relying on such error handling procedures to defer call acceptance is one approach, but may not be suitable for all carrier switches. It may be preferable to use a message flow that does not rely on default error handling procedures in the switch.

Figure 8:
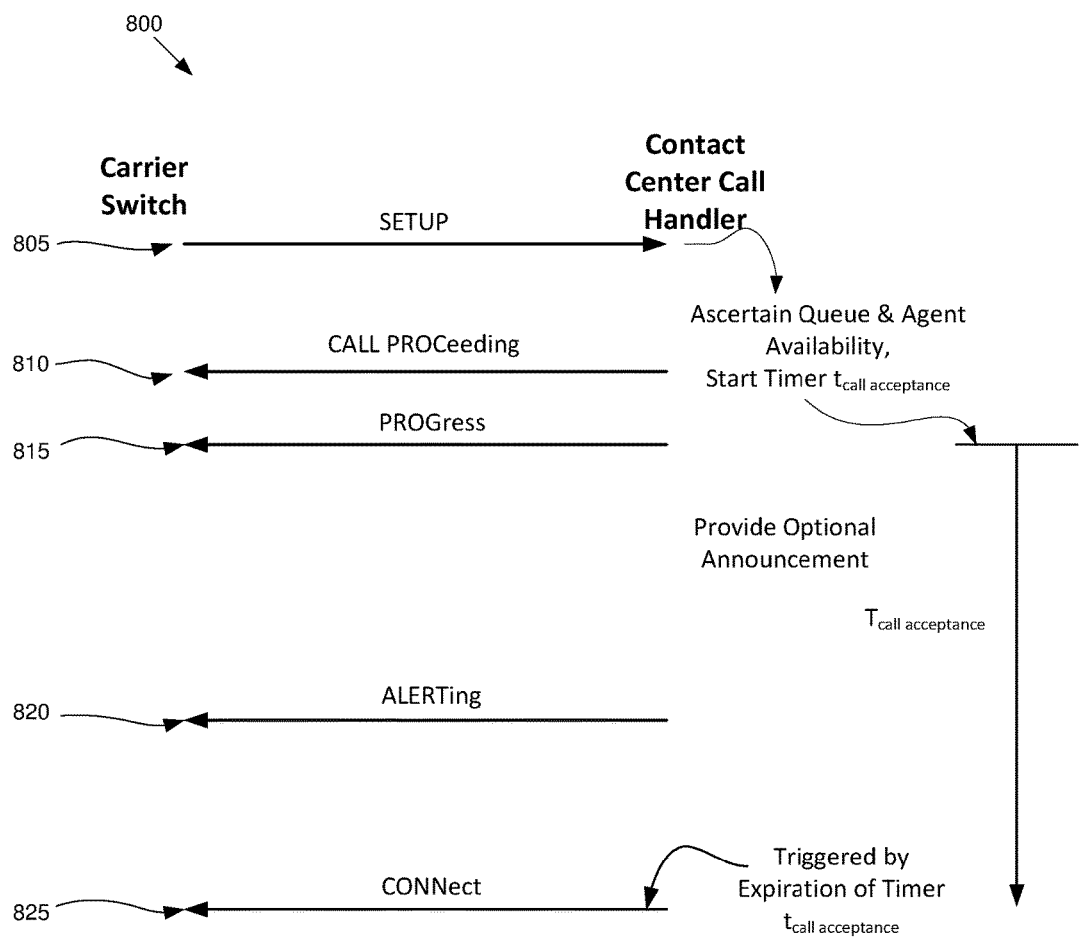

FIG. 8 illustrates another approach based on the ISDN protocol wherein call acceptance can be deferred without relying on default error handling procedures. In this message flow 800, the process begins with the carrier switch transmitting a call SETUP request 805 to the call handler. That call handler uses the calling and called party number to ascertain the appropriate queue and agent availability for that queue. The call handler then sends a CALL PROCeeding message 810 that acknowledges receipt of the SETUP message. The call handler also then starts the timer $t_{call\ acceptance}$ which defines a time period at the end of which a CONNect message must be sent to accept the call.

The call handler then sends a PROGress message 815, which is used to indicate that in-band tones or announcement may be provided, which causes the audio path to be cut-through backwards in the reverse direct. Thus, any audio information provided by the call handler will be heard by the calling party. The call handler could use this as an opportunity to provide, e.g., an announcement to the calling party, such as "Please wait, while we search for an available agent to handle your call." The carrier switch may start a timer upon receipt of the PROGress message 815, which indicates an in-band tone or announcement may be provided. However, this timer value may be relatively lengthy—e.g., up to 25 seconds or so. This is because the switch timer may be set to accommodate international calls. The contact center may then send an ALERTing message 820 to the carrier switch, but the audio path to the calling party has already been cut through at this point.

After sending the CALL PROCeeding. PROGress, or the ALERTing message, the call handler can provide various in-band tones or announcements without having to answer the call. This can be a ring-back tone or an announcement informing the calling party that an agent will be available shortly. During this time, the call handler can be determining whether an agent is available or waiting for an agent to become available. Upon the agent becoming available, or the $t_{call\ acceptance}$ expiring, the call handler will send a CONNect message 825 to the carrier switch. At this point, the call is accepted and billing will commence. Further, at this point, a bi-directional voice path is established between the call handler and the calling party. If an agent is available, the call can be connected to that agent, or if an agent in not available when the timer expires, the calling party may be played an announcement.

ALTERNATIVE EMBODIMENTS

The concepts disclosed above can be adapted for other protocols. For example, one VoIP protocol H.225 is similar to ISDN Q.931 and could be readily adapted for such use. Other VoIP protocols, such as SIP, could be adapted as well. In SIP, an INVITE messages is used to indicate a call offering, similar to the aforementioned SETUP. In response, the call handler could respond with a "SESSION PROGRESS 183" which will acknowledge receipt of the INVITE and allow the audio path to be cut-through in the reverse direction to allow in-band call progress tones or announcements. Once the call is to be accepted, the call handler sends an "OK 200" response message.

No doubt those skilled in the art will recognize in light of this disclosure other protocols or message flows that could be used to defer acceptance of a call while the call handler ascertains the appropriate queue and agent. In this manner, the billing time for a call can be reduced so that billing only starts when an actual bi-directional voice path is required between the calling party and the agent that the calling party is speaking to. This can reduce the billing time for each incoming call, albeit for a few seconds.

FIG. 8—Exemplary Computer Processing Device

As discussed earlier, there may be a number of distinct computer-based processing devices in various embodiments of the present invention, which execute modules for various purposes. For example, there may be an application specific computer processing device for processing the call control protocol, or a specific module executing in an existing processing device, such as a call handler, that ascertains the appropriate queue and agent status. In other embodiments, these processing devices and/or modules may be combined or distributed on various components. In some embodiments, the functionality of the modules performing the functions described herein may be integrated into a single module, processor, or microcontroller.

Figure 9:
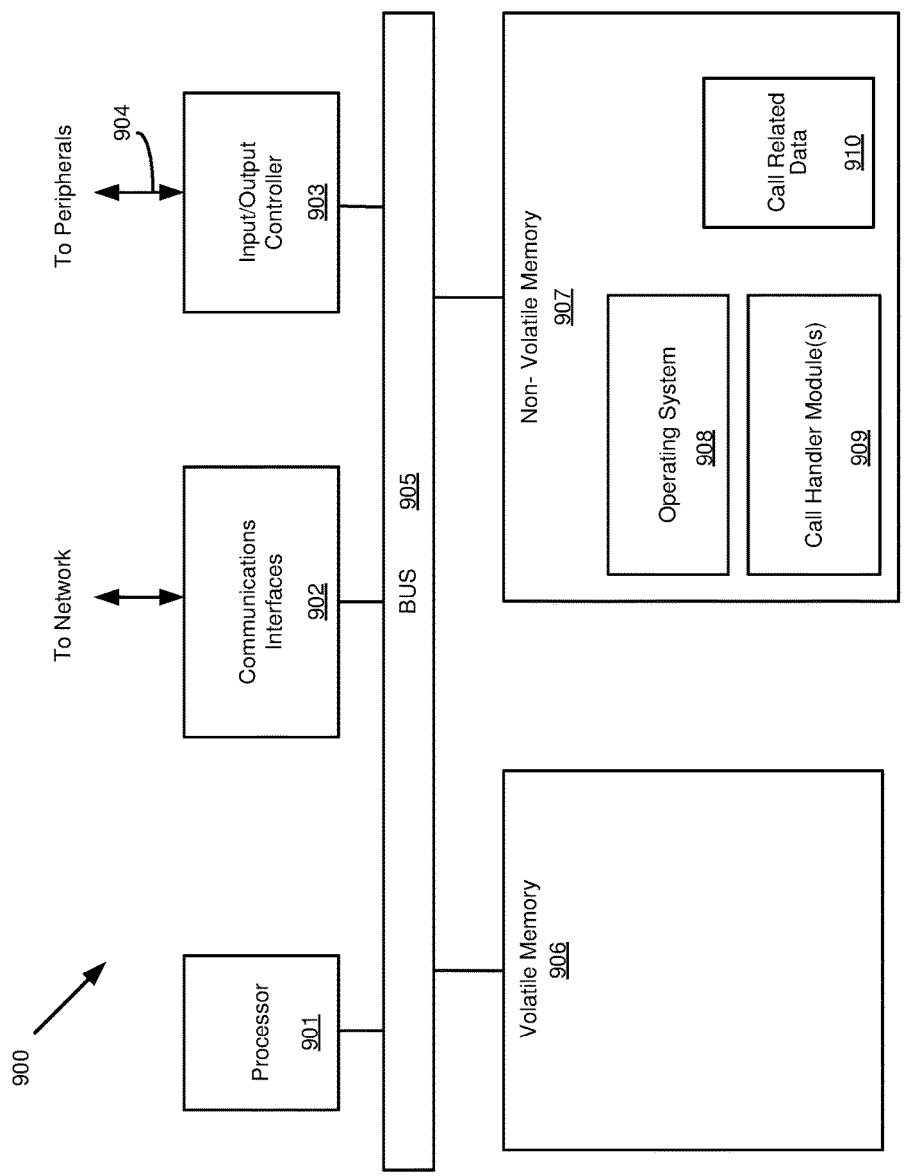
FIG. 9 discloses one embodiment of a processing system for practicing the concepts and technologies disclosed herein.

FIG. 9 is an exemplary schematic diagram of a computer processing system that may be used in an embodiment for any one of the components disclosed above to practice the technologies or process flows disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein. Such a computer processing system executing the modules disclosed herein converts that computer processor into a specialized computer processing system. For example, the contact device is specially configured to initiate communications using one or more selected channels.

As shown in FIG. 9, the processing system 900 may include one or more processors 901 that may communicate with other elements within the processing system 900 via a bus 905 or some other form of communication facility. The processor 901 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, Von Neumann based computer processing architecture, other circuitry, or the like.

In one embodiment, the processing system 900 may also include one or more communications interfaces 902 for communicating data via the local network, voice service provider, PSTN, or with various external devices. In various embodiments, the communication facility may be via wired, optical, or wireless networks (or a combination thereof). The communication may use a variety of data transmission protocols, such as fiber distributed data interface (FDDI), Ethernet, asynchronous transfer mode ("ATM"), or frame relay. The communications facilities may include any technology used to provide, e.g., ISDN interfaces. Although the interface may be an ISDN PRI interface, in other embodiments, a SIP or other VoIP-based signaling interface could be used.

The input/output controller 903 may also communicate with one or more input devices or peripherals using an interface 904, such as, but not limited to: a keyboard, a mouse, a touch screen/display input, microphone, pointing device, etc. The input/output controller 903 may also communicate with output devices or peripherals, such as displays, printers, speakers, headsets, banner displays, other components in the contact center, etc. These may be used, in part, to receive data, such as contact lists or profile data retrieved from an external database.

The processor 901 may be configured to execute instructions stored in volatile memory 906, non-volatile memory 907, or other forms of computer readable storage media accessible to the processor 901. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 907 may store program code and data, which also may be loaded into the volatile memory 906 at execution time. Specifically, the non-volatile memory 907 may store the call handler processing module 909 that may perform any of the above mentioned process flows, functions, or capabilities. Non-volatile memory may also store operating system code 908 containing instructions for performing the process and/or functions associated with the technologies disclosed herein. The call handler module 909 may also access the various call related data 910 previously disclosed. The volatile memory 906 and/or non-volatile memory 907 may be used to store other information including, but not limited to: records, applications, programs, scripts, source code, object code, byte code, compiled code, interpreted code, machine code, executable instructions, cause codes, call logs, summary call attempt statistics, or the like. These may be executed or processed by, for example, processor 901. These may form a part of, or may interact with, the call handler module 909. In some embodiments, the call handler module 909 may be integrated in another component identified previously.

The technologies described herein may be implemented in various ways, including as computer program products comprising memory storing instructions causing a processor to perform the operations associated with the above technologies. The computer program product comprises a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for processing an incoming call comprising a voice call at a call handler in a contact center wherein the incoming call originates from a calling party, the method comprising:
   receiving a call establishment request at an interface with a carrier offering the incoming call to the call handler;
   starting a call acceptance timer in the call handler after receiving the call establishment request, wherein expiry of the call acceptance timer causes the call handler to send a call acceptance message to the carrier thereby accepting the incoming call;
   detecting in the call handler an event comprising an occurrence of one of:
      an agent is available to accept the incoming call prior to an expiry of the call acceptance timer, and
      the expiry of the call acceptance timer occurring prior to the agent becoming available to accept the incoming call;
   sending the call acceptance message over the interface to the carrier accepting the incoming call in response to detecting the event.

2. The method of claim 1, wherein the call establishment request is a Q.931-based ISDN SETUP message and the call acceptance timer is started in response to receiving the Q.931-based ISDN SETUP message.

3. The method of claim 1, further comprising:
   providing an announcement to the calling party prior to sending the call acceptance message.

4. The method of claim 1, wherein sending the message over the interface to accept the incoming call comprises sending an ISDN CONNECT message.

5. The method of claim 1, wherein the call establishment request is a SIP-based INVITE message.

6. The method of claim 2, wherein a PROGRESS message is sent after the SETUP message.

7. The method of claim 6, wherein an ALERTING message is not sent prior to sending the call acceptance message.

8. A system for processing an incoming call to a contact center from a calling party, comprising a computer processor configured to:
   receive a call establishment request from a carrier at the contact center, wherein the call establishment request includes a telephone number dialed by the calling party;
   start a call acceptance timer in response to receiving the call establishment request, wherein expiry of the call acceptance timer causes a call acceptance message to be sent to the carrier accepting the incoming call, wherein the call acceptance timer expires in response to an event comprising an earlier occurrence of:
      a passage of pre-determined amount of time, and
      an agent from a group of one or more agents becoming available prior to the passage of the pre-determined amount of time;
   determine that none of the group of one or more agents are available to accept the incoming call and the expiry of the call acceptance timer has occurred; and
   send the call acceptance message to the carrier thereby accepting the incoming call.

9. The system of claim 8, whereupon when the agent from the group of one or more agents is available to accept the incoming call after the expiry of the call acceptance timer, the incoming call is connected to the agent.

10. The system of claim 8, wherein the call acceptance message is a Q.931 ISDN CONNECT message.

11. A system for processing an incoming call in a contact center from a calling party, comprising a computer processor configured to:
   receive at the contact center a call establishment request from a carrier on a signaling interface, wherein the call establishment request includes a telephone number dialed by the calling party;
   start a call acceptance timer after receiving the call establishment request, wherein expiry of the call acceptance timer causes a call acceptance message to be sent on the signaling interface to the carrier accepting the incoming call;
   detect an event comprising an occurrence of one of:
      an agent of the group of one or more agents is available to accept the incoming call prior to an expiry of the call acceptance timer, and
      the expiry of the call acceptance timer has occurred prior to the agent becoming available to accept the incoming call; and
   send the call acceptance message to the carrier on the signaling interface accepting the incoming call, after detecting the event.

12. The system of claim 11, wherein the call establishment request is a Q.931-based ISDN SETUP message and the call acceptance timer is started in response to receiving the SETUP message.

13. The system of claim 11, wherein an announcement is provided to the calling party prior to sending the call acceptance message.

14. The system of claim 12, wherein the message sent to the carrier to accept the incoming call is a Q.931-based ISDN CONNECT message.

15. The system of claim 12, wherein a PROGRESS message is sent after the SETUP message.

16. The system of claim 12, wherein an ALERTING message is not sent prior to sending the call acceptance message.

17. The system of claim 11, wherein the call establishment request is a SIP-based INVITE message.

18. A non-transitory computer readable medium storing instructions that when executed cause a computer processor to:
   receive a call establishment request on a signaling interface with a carrier at a contact center for an incoming call comprising a voice call, wherein the call establishment request includes a telephone number dialed by a calling party;
   start a call acceptance timer after receiving the call establishment request, wherein expiry of the call acceptance timer causes a call acceptance message to be sent to the carrier on the signaling interface accepting the incoming call, wherein the call acceptance timer expires upon an earlier of:
      a passage of a predefined amount of time, and
      an agent from a group of a plurality of agents becoming available prior to the passage of the predefined amount of time;
   determine the expiry of the call acceptance timer has occurred prior to the agent from the group of the plurality of agents becoming available to accept the incoming call; and
   send the call acceptance message to the carrier on the signaling interface thereby accepting the incoming call.

19. The non-transitory computer readable medium of claim 18, further comprising instructions that when executed cause the computer processor to:
   provide an announcement to the calling party before sending the call acceptance message.

20. The non-transitory computer readable medium of claim 18, further comprising instructions that when executed cause the computer processor to:
   connect the incoming call to the agent after determining the agent from the group of the plurality of agents is available to accept the incoming call.

\* \* \* \* \*